United States Patent
Marks et al.

(10) Patent No.: US 10,013,224 B2
(45) Date of Patent: Jul. 3, 2018

(54) SYSTEM AND METHOD FOR EXTRACTING RFID METADATA FROM A DOCUMENT

(71) Applicants: Mitchell G. Marks, Collaroy (AU); Chaminda Weerasinghe, Bella Vista (AU); David L. Geering, Upper Hutt (NZ)

(72) Inventors: Mitchell G. Marks, Collaroy (AU); Chaminda Weerasinghe, Bella Vista (AU); David L. Geering, Upper Hutt (NZ)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/698,393

(22) Filed: Apr. 28, 2015

(65) Prior Publication Data

US 2016/0321020 A1     Nov. 3, 2016

(51) Int. Cl.
*G06F 3/12* (2006.01)

(52) U.S. Cl.
CPC .......... *G06F 3/1288* (2013.01); *G06F 3/1206* (2013.01); *G06F 3/1245* (2013.01)

(58) Field of Classification Search
None
See application file for complete search history.

(56) References Cited

U.S. PATENT DOCUMENTS

| | | | | |
|---|---|---|---|---|
| 2005/0116034 A1* | 6/2005 | Satake | .................. | G06K 17/00 235/432 |
| 2006/0176511 A1* | 8/2006 | Tagawa | .................. | G06F 3/1222 358/1.15 |
| 2007/0121147 A1* | 5/2007 | Corona | .................. | G06F 3/1206 358/1.15 |
| 2009/0040561 A1* | 2/2009 | Sasaki | .................... | H04N 1/387 358/1.18 |
| 2010/0072269 A1* | 3/2010 | Scott | ................. | G06F 17/30725 235/375 |
| 2011/0026081 A1* | 2/2011 | Hamada | .................. | G06T 11/00 358/1.18 |
| 2012/0303496 A1* | 11/2012 | Musfeldt | ............... | H04L 9/3234 705/34 |
| 2013/0037605 A1* | 2/2013 | Cok | .................. | G06F 17/30879 235/375 |
| 2016/0026827 A1* | 1/2016 | Ko | ....................... | G06F 21/6209 713/193 |

* cited by examiner

*Primary Examiner* — Huo Long Chen
(74) *Attorney, Agent, or Firm* — SOCAL IP Law Group LLP; Jonathan Pearce; Steven C. Sereboff (57) ABSTRACT

There is disclosed methods, computing devices, and computer-readable media for printing and encoding RFID (radio frequency identification) labels. An RFID label document conforming to the Portable Document Format (PDF) is retrieved, the RFID label document including printable content and RFID encoding data embedded as metadata. The RFID encoding data is extracted from the RFID label document. Printable content of the RFID label document is displayed in a PDF viewer application. A print driver called by the PDF viewer application converts the printable content of the RFID label document into printer control language. The previously extracted RFID encoding data is incorporated into the printer control language, and the printer control language with incorporated RFID encoding data is transmitted to an RFID label printer.

17 Claims, 6 Drawing Sheets

SYSTEM AND METHOD FOR EXTRACTING RFID METADATA FROM A DOCUMENT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to printing and encoding labels having an embedded RFID (radio frequency identification) transponder.

Description of the Related Art

Radio-frequency identification is a wireless, noncontact method for automatically identifying and tracking tags attached to objects ranging from railroad cars to retail merchandise to livestock. A common type of RFID tag contains an antenna and a transponder integrated circuit chip, but not a battery or other power source. Such RIFD tags receive and store energy from an interrogating radio signal and then transmit a response powered by the stored energy. The response includes identifying information retrieved from a nonvolatile memory within the transponder integrated circuit chip.

The nonvolatile memory within an RFID transponder integrated circuit chip typically includes a 96-bit EPC (electronic product code) memory and optionally may include a user memory. Not all RFID transponder integrated circuit chips include a user memory. The user memory, if present, may store up to 8 kilobits. A typical size for a user memory is 512 bits.

An RFID tag must be encoded before it can be used, which is to say the appropriate identifying information must be stored in the nonvolatile memory within the transponder integrated circuit chip. Some RFID tags may be encoded during manufacture. Other tags may be encoded using a radio frequency transmitter that transmits the data to be stored in the nonvolatile memory and provides energy to the tag during programming.

An RFID label is a printable label with an embedded RFID transponder integrated circuit chip and antenna. Typically such labels include an adhesive backing covered by a releasable liner. When the releasable liner is removed, the adhesive backing may be used to affix the label to an object. An RFID label printer is used to print text and graphical information, such as a bar code, on the front of the label using direct thermal printing, thermal transfer printing, ink jet printing, or some other printing method. The RFID label printer contains a radio frequency transmitter to encode the transponder integrated circuit chip. The RFID label printer may also contain a receiver such that the information stored in the transponder integrated circuit chip may be read back to verify successful encoding.

Throughout this description, elements appearing in figures are assigned three-digit reference designators, where the most significant digit is the figure number where the element is introduced. An element that is not described in conjunction with a figure may be presumed to have the same characteristics and function as a previously-described element having the same reference designator.

DETAILED DESCRIPTION

Description of Apparatus

Figure 1:
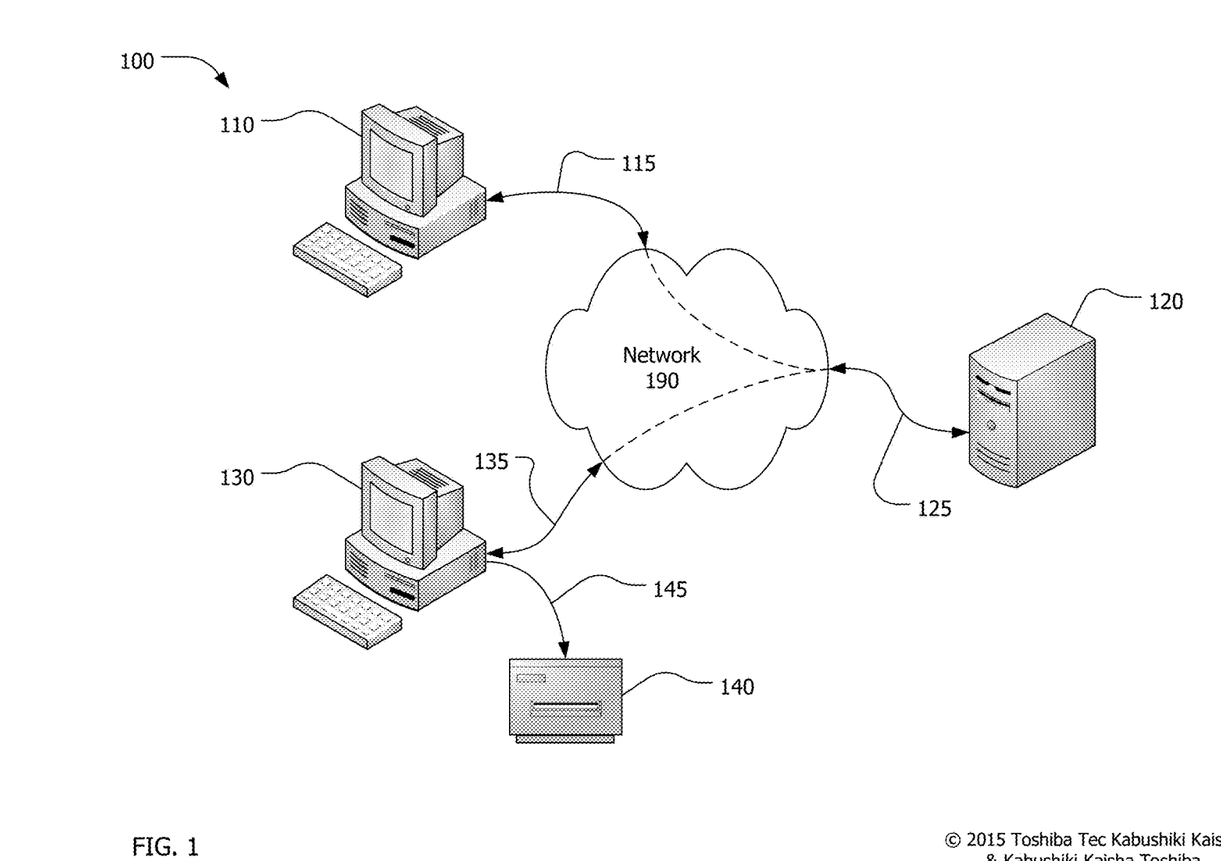
FIG. 1 is a block diagram of a system for designing and printing RFID labels.

Referring now to FIG. 1, a system 100 for designing and printing RFID labels may include a first client computer 110, a server computer 120, and a second client computer 130 linked to a network 190 by respective communications links 115, 125, 135. Each of the first client computer 110 and the second client computer 130 may be a desktop computer, a portable computer, a laptop computer, a tablet computer, a personal digital assistant, a smart phone, or some other form of computing device capable of performing the functions described herein. In some instances of the system 100, the first client computer 110 and the second client computer 130 may be the same device.

The network 190 may be a local area network, a metropolitan area network, a wide area network, or a network of some other extent. The network 190 may be a public network, a private network, or a virtual private network. The network 190 may be or include the Internet.

The second client computer 130 may be connected to an RFID label printer 140 through another communications link 145. The second client computer 130 and the RFID label printer 140 may be directly connected, as shown in FIG. 1, or may be connected via the network 190 or another network.

The communications links 115, 125, 135, 145 may be wired, wireless, optical, or a combination thereof.

Figure 2:
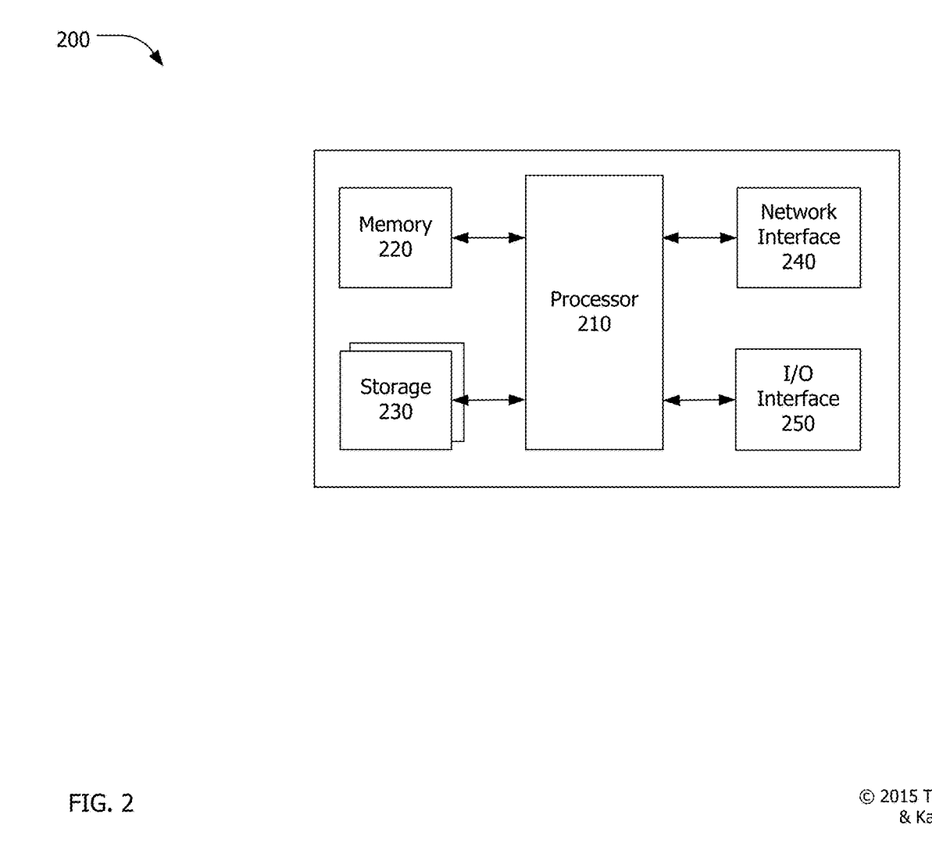
FIG. 2 is a block diagram of a computing device.

Turning now to FIG. 2, a computing device 200 may be representative of the first and second client computers 110, 130, the server computer 120, and other computing devices discussed herein. The computing device 200 may include a processor 210 coupled to a memory 220, storage 230, a network interface 240, and an I/O interface 250. The processor 210 may be or include one or more processes such as microprocessors, graphic processors, co-processors, digital signal processors, and other processors.

The memory 220 may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210.

The storage 230 may provide non-volatile, bulk or long term storage of data or instructions in the computing device 200. The storage 230 may take the form of a disk, tape, CD, DVD, or other reasonably high capacity addressable or serial storage medium. In this document, the term "storage medium" means a physical device or object for storing data and does not include transitory media such as signals or waveforms. Multiple storage devices may be provided or available to the computing device 200. Some of these storage devices may be external to the computing device 200, such as network storage or cloud-based storage.

The network interface 240 may be configured to interface to a network such as local area network, a wide area network, and/or the Internet.

The I/O interface 250 may be configured to interface the processor 210 to peripherals (not shown) such as displays, keyboards and USB devices.

The computing device 200 may include software, firmware, and/or hardware for providing functionality and features described herein. The computing device 200 may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client computer 100 may include various specialized units, circuits, software and interfaces for providing the functionality and features described herein. The processes, functionality and features may be embodied in whole or in part in software which operates on a client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by the processor 210 and others by other devices.

Figure 3:
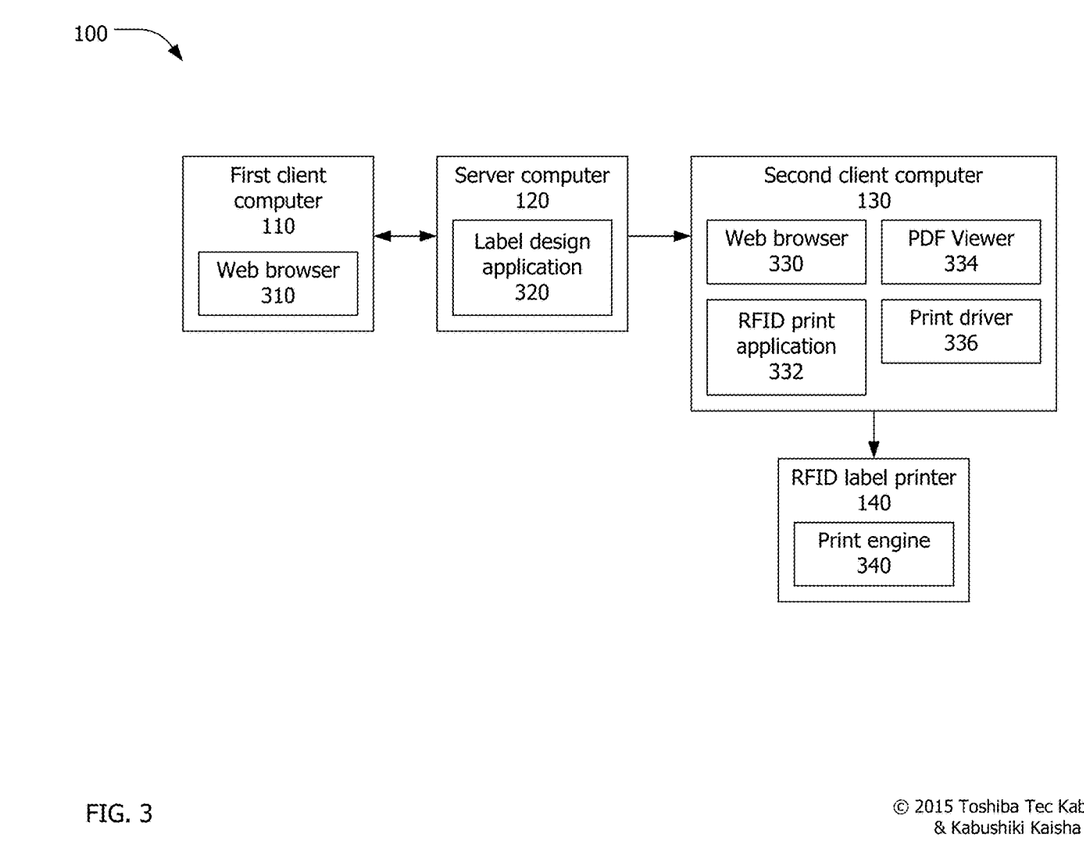
FIG. 3 is a functional block diagram of software programs running on a system such as the system of FIG. 1.

FIG. 3 is a functional block diagram of the software elements running on the system 100 previously shown in FIG. 1. A web browser 310 running on a first client computer 110 may be used to access a label design application 320 running on the server computer 120. The web browser 310 and the label design application 320 may collectively enable a user of the first client computer to design an RFID label.

The design of an RFID label may include both printable content (e.g. text and graphics) and data to be encoded in an RFID transponder contained within the RFID label to be printed. The data to be encoded in the RFID transponder will be referred to herein as "encoding data". The label design application 320 may document the printable content of the RFID label as a page description language (PDL) document and embed the encoding data of the PDL document as metadata. A page description language is a language that describes the appearance and content of a printed page at a higher level than an actual bitmap of the page. The most commonly used page description language is Adobe® Portable Document Format (PDF). Other page description languages include Adobe® Postscript® and numerous printer control languages developed by printer and computer manufacturers. The following description is based on the use of Portable Document Format. It should be understood that the system and method described herein are compatible with other page description languages.

For example, the design application 320 may document the printable content of the RFID label as a PDF document. Each PDF document contains a Document Catalog listing the components of the document and, optionally, a Document Information Directory containing metadata about the document (e.g. title, author, subject, keywords, etc.). The encoding data for the RFID label may be embedded in the PDF document as metadata, either as one or more entries in the Document Information Dictionary or as a metadata stream attached to the document by a metadata entry in the Document Catalog. The file containing the PDF document may be stored using a unique file name suffix (i.e. a suffix other than ".pdf") to identify the file as an RFID label document.

A web browser 330, which may be the same or different from the web browser 310, operating on the second client computer 130 enables a user of the second client computer to retrieve a RFID label document stored in the server computer 120. Recognizing the unique file name suffix, the web browser 330 may open an RFID print application 332. The RFID application 332 may extract the encoding data from the RFID label document and open a PDF viewer 334, such as Adobe Acrobat® or Adobe® Reader to allow the user of the second client computer 130 to view the printable content of the retrieved label document. The PDF viewer 334 may be unaware of, or unaffected by, the metadata containing the encoding data. Specifically, the PDF viewer 334 may receive the encoding data embedded as metadata within the RFID label document, but may merely ignore the encoding data because the encoding data is irrelevant to any display function of the PDF viewer 334. This has no effect on the viewing process itself and the PDF document may be displayed as though the metadata were not present at all.

Upon viewing the printable content of the retrieved label file, the user of the second client computer 130 may request that the RFID label be printed. The action the user takes to initiate printing of the RFID label may be the same as the actions taken to print any PDF file. The PDF viewer 334 may, as a part of an RFID label printing process, call a print driver 336 to convert the printable content of the RFID label into printer control language specific to the RFID label printer 140.

The printer control language specific to the RFID label printer 140 must include provisions for conveying encoding data to the RFID label printer. However, since the PDF viewer 334 is unaware of the encoding data, the PDF viewer 334 cannot provide the encoding data to the print driver 336. The RFID application 332 may merge the encoding data, previously extracted from the RFID label document, into the printer control language transmitted to the RFID label printer. Print engine software or firmware 340 within the RFID label printer 140 may convert the printer control language into commands for the printer hardware to cause the label to be printed.

Description of Processes

Figure 4:
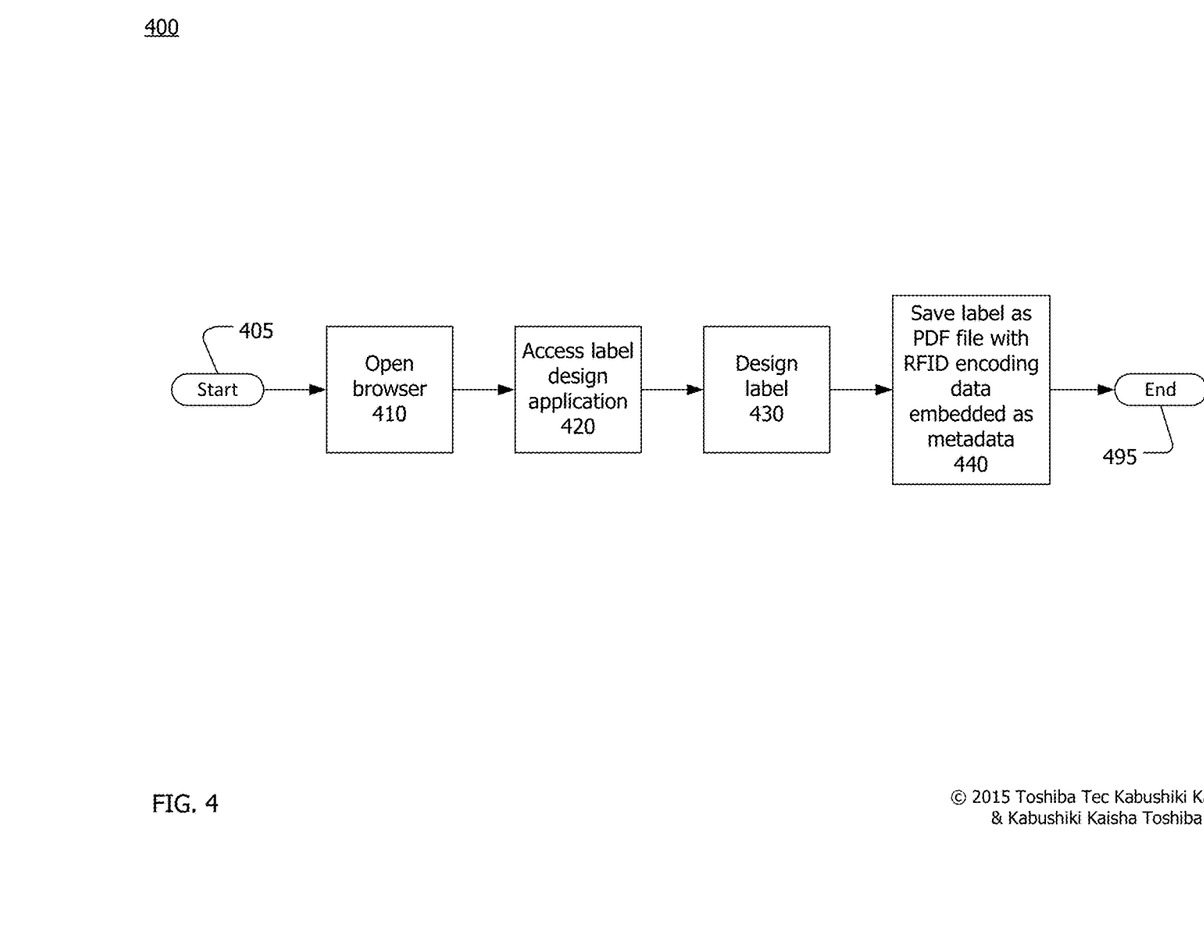
FIG. 4 is a flow chart of a process for designing an RFID label.

Referring now to FIG. 4, a process 400 for designing an RFID label starts at 405 and ends at 495.

At 410, the user may open software on the client computer that allows the client computer to access, at 420, a label design application running on a server such as the server 120. In FIG. 4 and the following discussion, the software on the client computer is assumed to be a web browser. However, this software could be a web browser, a mobile app, a tablet app, a thin client, or other software program.

Accessing the label design application may require the user to first provide authentication information such as a user name and password. Once access to the label design application is established, an RFID label may be designed at 430. Designing the RFID label at 430 may include the user selecting a label template from one or more previously stored templates, or the user creating a new label format that may optionally be stored as a label template for future use. Designing the RFID label at 430 may include the user providing text to be printed on the label surface. The text may be provided, for example, by the user "filling in the blanks" of a label template presented on a display device of the client computer, or by the user responding to prompts or questions from the label design application, or in some other manner. Designing the RFID label at 430 may include the user providing a Uniform Product Code (UPC) to be printed on the label surface as a bar code. Designing the RFID label at 430 may include the user uploading or otherwise providing graphical or pictorial information to be printed on the label surface. Graphical or pictorial information may be provided by the user, generated automatically, or created in response to textual elements obtained elsewhere (e.g. a database).

Designing the RFID label at 430 may include the user providing encoding data to be stored in nonvolatile memory within the RFID label. Typically, the encoding data may include a 96-bit (which may be expressed as 12 alphanumeric characters or 24 hexadecimal digits) EPC code to be stored in an EPC memory within the RFID label. The encoding data may optionally including additional text, numerical, or binary information to be stored in user memory with the RFID label.

When the label design at 430 is complete, the label design may be saved at 440 as a page description language document with encoding data embedded as metadata. For example, the printable content of the RFID label may be saved as part of a PDF document. The encoding data for the RFID label may be embedded in the PDF document as metadata, either as one or more entries in the Document Information Dictionary or as a metadata stream attached to the document by a metadata entry in the Document Catalog. The file containing the PDF document may be stored using a unique file name suffix (i.e. a suffix other than ".pdf") to identify the file as an RFID label document. The process 400 may then end at 495.

While the previous paragraphs described the use of the process 400 to design a single label, the process 400 may be readily adapted to design multiple labels. For example, the process 400 could be adapted to design a series of labels that share common printed content but have different EPC values and/or different UPC values. Multiple labels may be saved as a single RFID label document. For example, multiple labels may be saved as multiple pages in a single PDF document. Or, multiple PDF documents may be stored with quite similar metadata.

Figure 5:
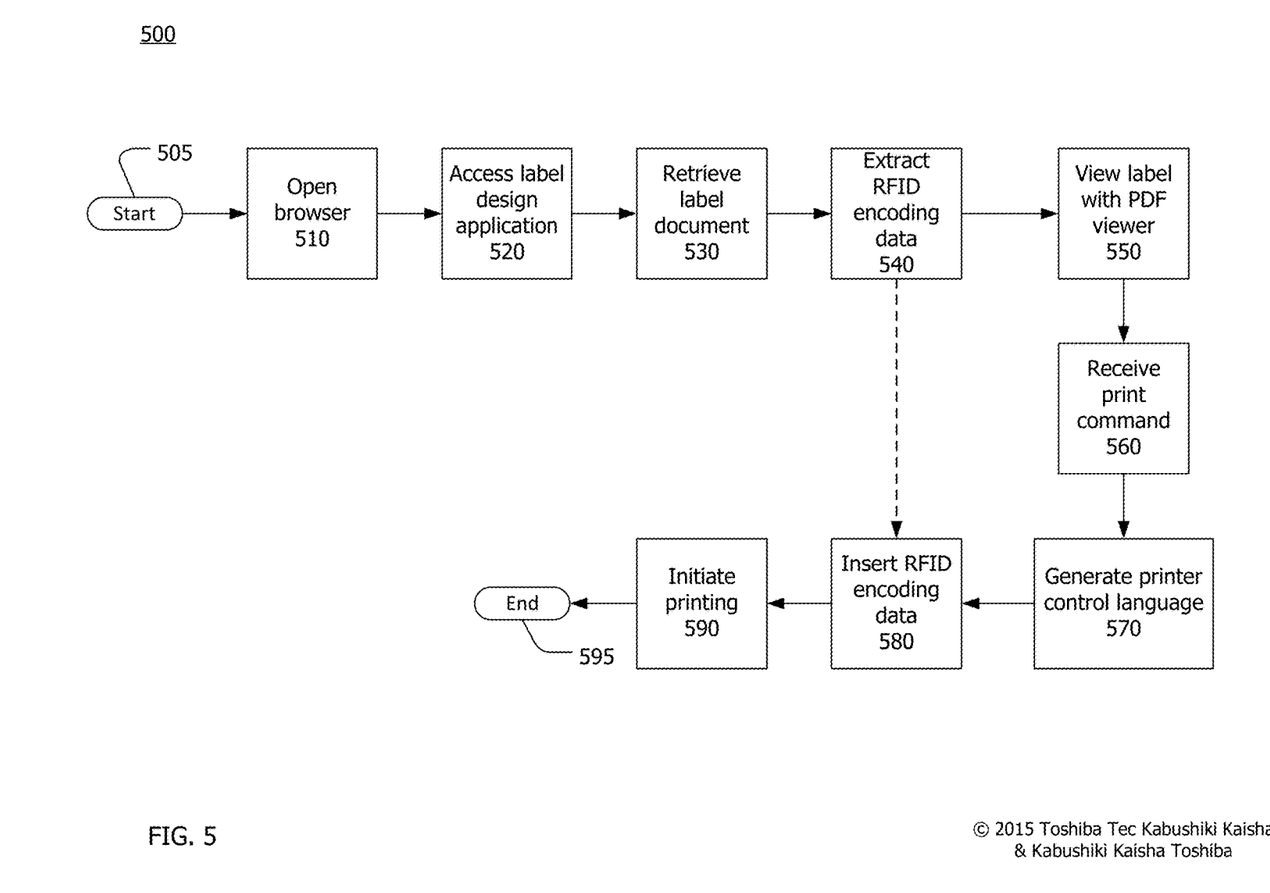
FIG. 5 is a flow chart of a process for printing an RFID label.

Referring now to FIG. 5, a process 500 for printing one or more RFID labels starts at 505 and ends at 595. The process 500 may be performed by a client computer, such as the second client computer 130, with input from a user.

At 510, the user may open software on the client computer that allows the client computer to access, at 520, a label design application running on a server such as the server 120. In FIG. 5 and the following discussion, the software on the client computer is assumed to be a web browser. However, this software could be a browser, a mobile app, a tablet app, a thin client, or other software program.

Accessing the label design application may require the user to first provide authentication information such as a user name and password. Once access to the label design application is established at 520, an RFID label document may be retrieved at 530. Retrieving the RFID label document may include selecting a particular RFID label document (or a link to the RFID label document) from a list or directory of RFID labels that were previously designed and stored on the server. The selected RFID label document may then be downloaded to the client computer and the web browser may be instructed to open the document, for example by the user double-clicking on the document name.

As previously described, the RFID label document may have a file name with a unique suffix that identifies the file as an RFID label document. The web browser may associate a particular file type, as indicated by its file name suffix, with a particular application used to open that file type. The first time an RFID label document file is opened, the user may need to associate the file suffix with an RFID print application running or available on the client computer. The steps taken to associate a file type or file name suffix with a particular application are well known and similar for various web browsers. Subsequently, upon receipt of a request to open an RFID label document, the web browser may automatically open the RFID print application.

Once open, at 540 the RFID print application may extract the RFID programming data from the metadata embedded in the RFID label document. The RFID programming data may be extracted without parsing the entire RFID document due to the hierarchical index contained in every PDF document. Every PDF document includes a cross-reference or XREF table that identifies the start (expressed as an offset in bytes from the start of the document) of each object in the document. Further, every PDF document ends in a trailer that identifies the start of the XREF table and which object in the XREF table is the Document Information Directory. At 540, the RFID document trailer may be consulted to locate the XREF table and the XREF table may then be consulted to locate the start of the Document Information Directory. The Document Information Directory may then be parsed to extract the programming data.

Programming data may be included in the Document Information Directory as one or more key-value pairs, such as "/RfidEpcMemoryPage1 (EM3986651001)", "/RfidEpcMemoryPage2 (EM3986651002)", or "/RfidUserMemoryPage1 ( . . . )". The key portions of the key-value pairs are assigned by the RFID label design application and can be arbitrary so long as the meaning of each key is known to the RFID label print application. Including a page number in each key facilitates printing multiple RFID labels from a single RFID document.

The extracted metadata may be saved in memory for future use. The RFID print application may also open a PDF viewer application, such as Adobe® Acrobat® or Adobe® Reader, to display the printable content of the RFID label document on a display device of the client computer. The user may inspect the displayed label to confirm that the correct label was retrieved at 530. Once the user has confirmed the label selection, a print command may be received from the user at 560. The steps taken by the user to generate the print command may be similar to the steps required to print any PDF document.

For ease of description, FIG. 5 shows the RFID programming data extracted at 540 before the PDF viewer is opened at 550. In practice, the RFID programming data may be extracted before the label viewer is opened, while the label is being viewed by the user at 550, or upon receipt of the print command at 560.

Upon receipt of the print command, the PDF viewer and a print driver may collectively convert the printable content of the RFID label into printer control language at 570. The printer control language may be specific to the RFID label printer that will be used to print the RFID label or labels. For example, assuming the label printer is manufactured by Toshiba Corporation, the print driver may convert the printable content of the RFID label into TPCL (Toshiba Printer Control Language). The printer control language specific to any RFID label printer must include provisions for conveying encoding data to the RFID label printer. However, the PDF viewer used to view the label at 550 is unaware of the encoding data. Thus the PDF viewer cannot provide the encoding data to be incorporated into the printer control language generated at 570. Rather, the RFID print application may merge the encoding data, previously extracted from the RFID label document at 540, into the printer control language at 580. The printer control language may then be transmitted to the RFID label printer at 590 to initiate printing, and the process 500 may end at 595.

Figure 6:
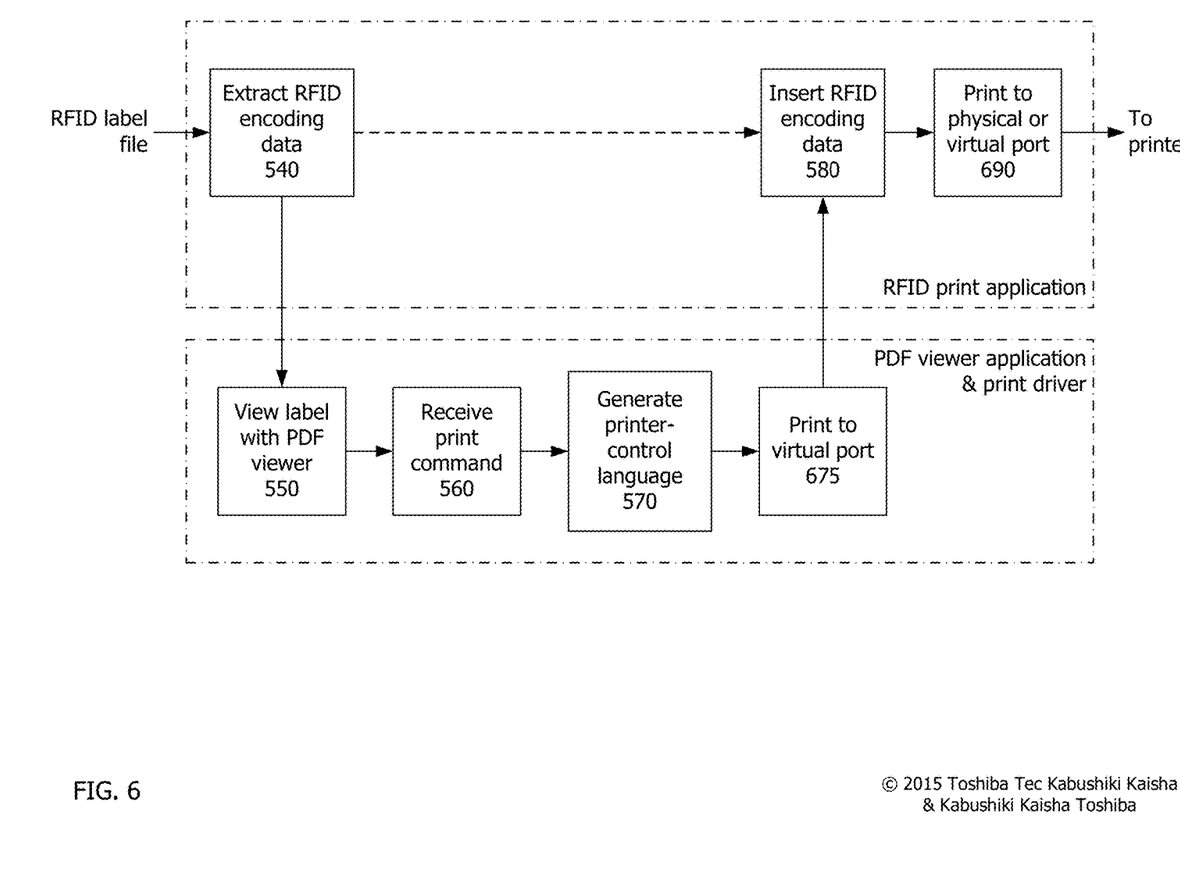
FIG. 6 is a flow chart of portions of a process for printing an RFID label.

FIG. 6 provides additional details of an exemplary implementation of the RFID label printing process 500. The actions at 540, 550, 560, 570, and 580 are generally the same as described in conjunction with FIG. 5. Complete descriptions of these actions will not be repeated.

Software, such as a print driver, communicates with a peripheral device, such as a printer, through a port. Traditionally, a "port" is a physical outlet on a computer that provides a direct link to a peripheral device, typically though an interconnecting cable. A physical port may be a serial port, a parallel port, or some other form of port depending on how data is transmitted through the port. A port may also be a "virtual port", which is a non-physical port that emulates the characteristic of a physical port. Virtual ports are commonly used when data has to be sent through a separate software layer, such as a network interface controller (NIC) or universal serial bus (USB) controller.

At 570, a print driver called by the PDF viewer application may convert the printable content of the RFID label into printer control language. At 675, the printer control language may be sent to a virtual port that redirects the printer control language to a module of the RFID print application. The RFID application may then insert RFID encoding data, previously extracted from the RFID label document at 540, into the printer control language. At 690, the printer control language (including RFID encoding data) may be sent to a physical port (if the RFID label printer is connected to a serial or parallel port on the client computer) or another virtual port (if the RFID label printer is connected to the computer via a network or a bus such as a USB bus).

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method performed by a client computer for printing and encoding radio frequency identification (RFID) labels, comprising:

retrieving an RFID label document conforming to the Portable Document Format (PDF), the RFID label document including printable content and undisplayed RFID encoding data embedded as metadata, the undisplayed RFID encoding data embedded as metadata having no effect on the viewing process for the RFID label document;

extracting the RFID encoding data from the RFID label document;

displaying the printable content of the RFID label document on a display device of the client computer using a PDF viewer application without display of the RFID encoding data on the PDF viewer application;

calling a print driver by the PDF viewer application to convert the printable content of the RFID label document into a single printer control language document;

inserting the RFID encoding data into the single printer control language document;

transmitting the single printer control language document to an RFID label printer, and outputting a physical RFID label including an RFID transponder and a visible label, the RFID encoding data written to the RFID transponder by the RFID label printer and the visible label output by the RFID label printer from the single printer control language document.

2. The method of claim 1, wherein extracting the RFID encoding data further comprises:

consulting a trailer of the RFID label document to locate a cross-reference (XREF) table within the RFID label document;

consulting the XREF table to locate a document information directory within the RFID label document; and parsing the document information directory to extract the RFID encoding data.

3. The method of claim 2, wherein the RFID label document includes content for two or more RFID labels, and extracting, from the document information directory, at least a respective key-value pair representing data to be encoded into an electronic product code memory within each of the two or more RFID labels.

4. The method of claim 2, wherein extracting the RFID encoding data further comprises:

extracting, from the document information directory, at least a first key-value pair representing data to be encoded into an electronic product code memory within the RFID label.

5. The method of claim 4, wherein extracting the RFID encoding data further comprises:

extracting, from the document information directory, a second key-value pair representing data to be encoded into a user memory with the RFID label.

6. The method of claim 1, wherein incorporating the RFID encoding data into the single printer control language document further comprises:

the print driver sending printer control language representing the printable content of the RFID label to a virtual port; and the virtual port redirecting the printer control language to an RFID label print application that incorporates the RFID encoding data into the single printer control language document.

7. A computing device, comprising:
a processor;
a display device coupled to the processor; and
a memory coupled to the processor, the memory storing program instructions that, when executed, cause the computer to perform actions, comprising:
   retrieving a radio frequency identification (RFID) label document conforming to the Portable Document Format (PDF), the RFID label document including printable content and undisplayed RFID encoding data embedded as metadata, the undisplayed RFID encoding data embedded as metadata having no effect on the viewing process for the RFID label document;
   extracting the RFID encoding data from the RFID label document;
   displaying the printable content of the RFID label document on the display device using a PDF viewer application without displaying the RFID encoding data on the PDF viewer application;
   calling a print driver by the PDF viewer application to convert the printable content of the RFID label document into a single printer control language document;
   incorporating the RFID encoding data into the single printer control language document;
   transmitting the single printer control language document to an RFID label printer; and
   outputting a physical RFID label including an RFID transponder and a visible label, the RFID encoding data written to the RFID transponder by the RFID label printer and the visible label output by the RFID label printer from the single printer control language document.

8. The computing device of claim 7, wherein extracting the RFID encoding data further comprises:
   consulting a trailer of the RFID label document to locate a cross-reference (XREF) table within the RFID label document;
   consulting the XREF table to locate a document information directory within the RFID label document; and
   parsing the document information directory to extract the RFID encoding data.

9. The computing device of claim 8, wherein extracting the RFID encoding data further comprises:
   extracting, from the document information directory, at least a first key-value pair representing data to be encoded into an electronic product code memory within the RFID label.

10. The computing device of claim 9, wherein extracting the RFID encoding data further comprises:
   extracting, from the document information directory, a second key-value pair representing data to be encoded into a user memory with the RFID label.

11. The computing device of claim 8, wherein
the RFID label document includes content for two or more RFID labels, and
extracting, from the document information directory, at least a respective key-value pair representing data to be encoded into an electronic product code memory within each of the two or more RFID labels.

12. The computing device of claim 7, wherein incorporating the RFID encoding data into the single printer control language document further comprises:
   the print driver sending printer control language representing the printable content of the RFID label to a virtual port; and
   the virtual port redirecting the printer control language to an RFID label print application that incorporates the RFID encoding data into the single printer control language document.

13. A non-transitory computer-readable storage medium storing instructions that, when executed by a computing device, cause the computing device to perform actions comprising:
   retrieving a radio frequency identification (RFID) label document conforming to the Portable Document Format (PDF), the RFID label document including printable content and undisplayed RFID encoding data embedded as metadata, the undisplayed RFID encoding data embedded as metadata having no effect on the viewing process for the RFID label document;
   extracting the RFID encoding data from the RFID label document;
   displaying the printable content of the RFID label document on a display device of the client computer using a PDF viewer application without displaying the RFID encoding data on the PDF viewer application;
   calling a print driver by the PDF viewer application to convert the printable content of the RFID label document into a single printer control language document;
   incorporating the RFID encoding data into the single printer control language document;
   transmitting the single printer control language document to an RFID label printer; and
   outputting a physical RFID label including an RFID transponder and a visible label, the RFID encoding data written to the RFID transponder by the RFID label printer and the visible label printed by the RFID label printer from the single printer control language document.

14. The non-transitory computer-readable storage medium of claim 13, wherein extracting the RFID encoding data further comprises:
   consulting a trailer of the RFID label document to locate a cross-reference (XREF) table within the RFID label document;
   consulting the XREF table to locate a document information directory within the RFID label document; and
   parsing the document information directory to extract the RFID encoding data.

15. The non-transitory computer-readable storage medium of claim 14, wherein extracting the RFID encoding data further comprises:
   extracting, from the document information directory, at least a first key-value pair representing data to be encoded into an electronic product code memory within the RFID label.

16. The non-transitory computer-readable storage medium of claim 15, wherein extracting the RFID encoding data further comprises:
   extracting, from the document information directory, a second key-value pair representing data to be encoded into a user memory with the RFID label.

17. The non-transitory computer-readable storage medium of claim 13, wherein incorporating the RFID encoding data into the single printer control language document further comprises:
    the print driver sending printer control language representing the printable content of the RFID label to a virtual port; and
    the virtual port redirecting the printer control language to an RFID label print application that incorporates the RFID encoding data into the single printer control language document.

\* \* \* \* \*